United States Patent
Addae et al.

(10) Patent No.: US 11,238,751 B1
(45) Date of Patent: Feb. 1, 2022

(54) SYSTEMS AND METHODS OF TESTING ADMINISTRATION BY MOBILE DEVICE APPLICATION

(71) Applicant: Bubble-In, LLC, Redlands, CA (US)

(72) Inventors: Helena Addae, Redlands, CA (US); Arturo Concepcion, San Bernardino, CA (US)

(73) Assignee: Bubble-In, LLC, Redlands, CA (US)

( * ) Notice: Subject to any disclaimer, the term of this patent is extended or adjusted under 35 U.S.C. 154(b) by 325 days.

(21) Appl. No.: 16/363,082

(22) Filed: Mar. 25, 2019

(51) Int. Cl.
  *G09B 7/077* (2006.01)
  *G06Q 50/20* (2012.01)
  *G09B 7/02* (2006.01)

(52) U.S. Cl.
  CPC .......... *G09B 7/077* (2013.01); *G06Q 50/205* (2013.01); *G09B 7/02* (2013.01)

(58) Field of Classification Search
  None
  See application file for complete search history.

(56) References Cited

U.S. PATENT DOCUMENTS

| | | | | |
|---|---|---|---|---|
| 6,112,049 A * | 8/2000 | Sonnenfeld | | G09B 5/14 434/118 |
| 7,618,259 B2 * | 11/2009 | Manos | | G09B 7/00 434/112 |
| 8,545,232 B1 * | 10/2013 | Bardige | | G09B 7/08 434/322 |
| 8,789,197 B1 * | 7/2014 | Wolfram | | G06F 7/544 726/26 |
| 8,858,313 B1 * | 10/2014 | Selfors | | A63F 13/65 463/9 |
| 2002/0087560 A1 * | 7/2002 | Bardwell | | G09B 7/00 |
| 2002/0115051 A1 * | 8/2002 | Sanda | | G09B 5/00 434/350 |
| 2002/0133565 A1 * | 9/2002 | Huat | | G06Q 10/107 709/218 |
| 2002/0182578 A1 * | 12/2002 | Rachman | | G09B 5/06 434/350 |
| 2003/0028588 A1 * | 2/2003 | McConnell | | G09B 7/00 709/203 |

(Continued)

*Primary Examiner* — William D Ermlick
(74) *Attorney, Agent, or Firm* — Andrew S. Langsam; Pryor Cashman LLP

(57) ABSTRACT

A testing administration system and method including a primary device associated with a test administrator, the primary device configured to permit, via a primary device application executable thereon, creation of one or more composed test question sets and associated and correct test question answers and review of one or more completed test taker question answer sets; one or more secondary devices individually associated with one or more test takers, each of the one or more secondary devices configured to permit, via a secondary device application executable thereon, access to a test question set of the one or more composed test question sets and wireless submission of a test taker's individual test question answer set; and a server connected with the primary device and the one or more secondary devices, the server configured to store and evaluate the one or more composed test question sets, the one or more test taker's completed test question answer sets in a hosted database and to provide grades based thereon and/or other testing analysis.

16 Claims, 3 Drawing Sheets

(56) References Cited

U.S. PATENT DOCUMENTS

| | | | |
|---|---|---|---|
| 2003/0087223 A1* | 5/2003 | Walker | G09B 7/02 434/353 |
| 2003/0115550 A1* | 6/2003 | Womble | G09B 7/02 715/210 |
| 2003/0180703 A1* | 9/2003 | Yates | G09B 7/00 434/353 |
| 2004/0048234 A1* | 3/2004 | Allen | G09B 5/00 434/350 |
| 2004/0125149 A1* | 7/2004 | Lapidous | G06F 3/0481 715/808 |
| 2005/0287510 A1* | 12/2005 | Sumrall | G09B 7/02 434/353 |
| 2006/0134593 A1* | 6/2006 | Kalous | G09B 5/00 434/350 |
| 2006/0216683 A1* | 9/2006 | Goradia | G09B 7/02 434/322 |
| 2006/0294552 A1* | 12/2006 | Swanson | G06Q 30/02 725/80 |
| 2007/0117083 A1* | 5/2007 | Winneg | G09B 7/00 434/350 |
| 2007/0122788 A1* | 5/2007 | Stevens | G09B 7/00 434/323 |
| 2007/0172809 A1* | 7/2007 | Gupta | G09B 7/00 434/350 |
| 2010/0047758 A1* | 2/2010 | McCurry | G09B 7/02 434/353 |
| 2010/0159433 A1* | 6/2010 | Graham | G09B 7/00 434/353 |
| 2010/0255453 A1* | 10/2010 | Chincarini | G09B 7/00 434/322 |
| 2011/0217687 A1* | 9/2011 | Yeh | G09B 7/00 434/362 |
| 2012/0041904 A1* | 2/2012 | Wit | G09B 7/00 706/12 |
| 2012/0042358 A1* | 2/2012 | Kondur | G06F 21/316 726/3 |
| 2012/0088217 A1* | 4/2012 | Freeman | G09B 7/00 434/350 |
| 2012/0190001 A1* | 7/2012 | Knight | G09B 7/00 434/362 |
| 2012/0208164 A1* | 8/2012 | Hoda | G09B 7/04 434/350 |
| 2013/0116044 A1* | 5/2013 | Schwartz | A63F 13/12 463/29 |
| 2013/0267285 A1* | 10/2013 | Kelley | G09B 5/125 463/9 |
| 2013/0325665 A1* | 12/2013 | Shaffer | G06Q 50/20 705/26.61 |
| 2014/0011176 A1* | 1/2014 | Mayumi | G09B 7/00 434/336 |
| 2014/0024009 A1* | 1/2014 | Nealon | G09B 5/12 434/362 |
| 2014/0222995 A1* | 8/2014 | Razden | G09B 7/02 709/224 |
| 2014/0227674 A1* | 8/2014 | Wit | G09B 7/00 434/362 |
| 2014/0240507 A1* | 8/2014 | Hsu | H04N 7/185 348/159 |
| 2014/0308645 A1* | 10/2014 | Chaniotakis | H04W 4/80 434/350 |
| 2015/0050633 A1* | 2/2015 | Christmas | G06F 3/0484 434/322 |
| 2015/0099256 A1* | 4/2015 | Liu | G09B 7/02 434/353 |
| 2015/0199598 A1* | 7/2015 | Lams | G06K 17/0032 434/358 |
| 2015/0279371 A1* | 10/2015 | Fujioka | G10L 25/48 704/275 |
| 2016/0180733 A1* | 6/2016 | Foley, Jr. | G09B 7/077 434/320 |
| 2016/0293036 A1* | 10/2016 | Niemi | G09B 7/04 |
| 2017/0046966 A1* | 2/2017 | Velasquez | G09B 7/02 |
| 2017/0256174 A1* | 9/2017 | Goodfriend | H04W 24/08 |
| 2017/0345109 A1* | 11/2017 | Cejnar | G09B 7/00 |
| 2018/0114455 A1* | 4/2018 | Brecknell | G06F 21/552 |
| 2019/0065783 A1* | 2/2019 | Dyer | G06F 21/6281 |
| 2019/0180640 A1* | 6/2019 | Foster | G09B 7/02 |
| 2020/0175885 A1* | 6/2020 | Lelo | G06F 3/0482 |
| 2020/0192530 A1* | 6/2020 | Masri | G06F 3/04842 |
| 2021/0304339 A1* | 9/2021 | Neelakanta | G09B 7/00 |

\* cited by examiner

SYSTEMS AND METHODS OF TESTING ADMINISTRATION BY MOBILE DEVICE APPLICATION

TECHNICAL FIELD

The present invention involves systems and methods of administering testing and recording answers, including classroom examination testing, via a wireless, non-written, mobile device application.

BACKGROUND OF THE INVENTION

In a classroom testing setting, for example, periodic or final tests may be administered in a multiple-choice format making use of SCANTRON, computer readable cards for evaluating the answers and providing metrics to the administrator. However, there have been, and continue to be, great deficiencies associated with SCANTRON-administered testing and answers. Issues include test-taker cheating, as students are often in close quarters during testing, which permits viewing and copying of SCANTRON card answers. Additionally, test questions may be provided on separate, printed test question papers, which may be stolen or lost by the administration and then transmitted to other students prior to their test administration. Issues with SCANTRON cards also include inefficiencies, as SCANTRON cards require a reader device to evaluate the test. The cards need to be maintained in a non-folded and clean manner for evaluation by a machine reader. This reader device, however, is capable of malfunctioning or breaking down, creating testing result delays. Moreover, the reader device may incorrectly register certain SCANTRON card answers due to inadequate penciling into the correct answer "circle" or insufficient and/or messy erasures by the student the test taker. There is a need for a testing mechanism that avoids the cheating and evaluation inefficiency issues of SCANTRON testing. The present invention provides a simple, cheat-proof mechanism which also solves other test administration issues, too.

SUMMARY OF THE INVENTION

The present invention is directed to systems and methods that may utilize a mobile device software (or hardware or firmware) application on a mobile smart phone or similar device, including ANDROID- and IOS-based mobile devices, to administer educational or other testing, including multiple choice testing or SCANTRON-type testing. Such systems and methods provide several key benefits. First, there is no need for printed test question and answer papers, as the test questions may be provided by and within the mobile device application and the answers recorded on the mobile device and wirelessly transmitted to a server, within the control of the test administrator for evaluation. Second, the test questions may be reordered within the application for different test takers, such as on the basis of students' proximity to one another or just a predetermined or randomized sort so that each or several students are presented with the same questions but in a different order from one another. This ensures less cheating on the answers, of course. In a preferred embodiment, test takers seated next to each other will have questions presented in a different test order from one another within their respective mobile device applications. A mobile device application may be configured to wirelessly connect with publishing entities, such as textbook publishing entities, to access and utilize their materials, including test question banks, in creating tests for the presented material. Additionally, the mobile device application may connect to the server which can compare the answers as provided by the test taker to the answer key as provided by the test administrator (or the publisher of the material to be taught) and thus provide quick test results as well as additional metrics and statistics to the test taker (e.g., student), the administrator (e.g., instructor), or both. This can be highly valuable to teaching material and to learning the same. The administrator can quickly determine which students are having difficulty with the material, and whether the teacher has or has not fulfilled his/her responsibility to teach, if too many students do not show material mastery.

In general, in one aspect, the invention features a system for testing administration, including a primary device associated with a test administrator, the primary device configured to permit, via a primary device application stored and executed and executable thereon, creation of one or more composed test question sets, and, the answer key to the test questions, and review of one or more completed test answer sets as provided by the student(s) on one or more secondary devices (smart phones or similar devices) associated with one or more test takers, each of the one or more secondary devices configured to permit, via a secondary device application executed and stored thereon, access to a test question set of the one or more composed test question sets and wireless submission of a test answer set to the composed test question sets; and a server connected with the primary device and the one or more secondary devices, the server configured to store at least some identifying information relating to the one or more composed test question sets and the submitted test answers, so that the server can evaluate the one or more completed test answer sets in a hosted database. This allows the test administrator to score the tests, allows him/her to provide the results of the tests to the students and allows for many metrics and comparisons, e.g., high score, average, mean, mode, standard deviation, which questions were most understood by the students and which material of the questions were least understood by the students, etc. All of these materials can be valuable to the students and the teachers.

Implementations of the present invention may include one or more of the following features. The primary device may be a personal computer or a mobile computing device. The primary device application may be a browser-based application on the primary device. The primary device application may be configured to allow the administrator to create test questions and the associated correct answers. More than the number of questions to be asked can be composed in the test questions data bank and the software/program can select which of the questions to be asked to which students. The basic content will be the same, of course, to promote uniformity but, for example, some content can change from student to student, e.g., numbers for substitution into a polynomial expression for calculating the result. The administrator will provide the answer key (correct answer for the multiple choice test) and the student will then "take" the test under the controlled environment. The test takers' answers will be recorded and submitted via the secondary device, the mobile or smart phone, and the answers wirelessly submitted to the server. It, having the proper test answers will compare the answers for each of the questions to the proper answers and provide the administrator with the results and also provide one or more statistics and/or metrics associated with the one or more completed test answer sets. Each of the one or more secondary devices may be a mobile computing device. The secondary device application (on the secondary device) may be a mobile device software, hardware or firmware application. The secondary device application will be configured to wirelessly submit the test answer set either one question/answer at a time or after a pressing or a touching of a submission feature for a defined intentional submission duration activation. The secondary device application may be further configured to auto submit the test answers after a predetermined time has elapsed from opening the test. Also, to ensure against consulting with others and/or materials, a time duration for which a test taker has closed the secondary device application can be determined, and the secondary device application may be further configured to automatically submit the test answer upon the duration exceeding a defined acceptable duration and/or the device may provide a warning message to the test taker upon a duration not exceeding the defined acceptable duration thus giving the test-taker a warning of "closing in" on an auto submit of test answers. An order of questions of the test question set may be configured to vary between a first test taker and a second or another test taker of the one or more test takers, the varying being based on a randomized reordering generation, a predetermined change of order and/or based on a physical proximity between the first test taker and the second and other test takers. This, too, is meant to minimize the ability of test taker(s) to cheat and game the system.

In general, in another aspect, the invention features a method of testing administration, including creating one or more composed test question sets via a primary device application executed on a primary device associated with a test administrator, storing the one or more composed test question sets in a database hosted on a server connected with the primary device and one or more secondary devices associated with one or more test takers, accessing a test question set of the one or more composed test question sets from the database via a secondary device application executed on a secondary device application of the one or more secondary devices, having the test takers wirelessly submit a test answer set corresponding to the test question set via the secondary device application and the secondary device, storing the test answer set in the database, comparing the same to the correct answers as provided by the administrator and the answer key and providing results of the performance of the individual test takers and the group of the same along with some measure of the teacher's ability to convey the information in a manner commensurate with the test takers' abilities and knowledge level/development.

Implementations of the present invention may include one or more of the following features. The primary device may be a personal computer or a mobile computing device. The primary device application may be a browser-based application. The primary device application may provide one or more statistics or metrics associated with one or more completed test answer sets. The secondary device may be a mobile computing device like a smart phone with a screen and one or more key(s) or the ability to move a cursor on the screen. The secondary device application may be a mobile device application. The secondary device application may submit the test answer set after a pressing or a touching of a submission feature for a defined intentional submission duration. The secondary device application may time a duration in which a test taker has closed the secondary device application (and provide an auto submit to the primary device of the answers up to that point, i.e., the secondary device application may automatically submit the test answer set upon the duration exceeding a defined acceptable duration of application closing and/or provide a warning message to the test taker upon the duration not exceeding but getting close to, the defined acceptable duration of inattention or closing of the application, i.e., the test. An order of questions of the test question set may vary between a first test taker and a second or another test takers—the varying being based on a randomized reordering generation or a physical proximity between the first test taker and the second and other test takers.

DETAILED DESCRIPTION OF THE PREFERRED EMBODIMENTS AND THE DRAWINGS

Figure 1:
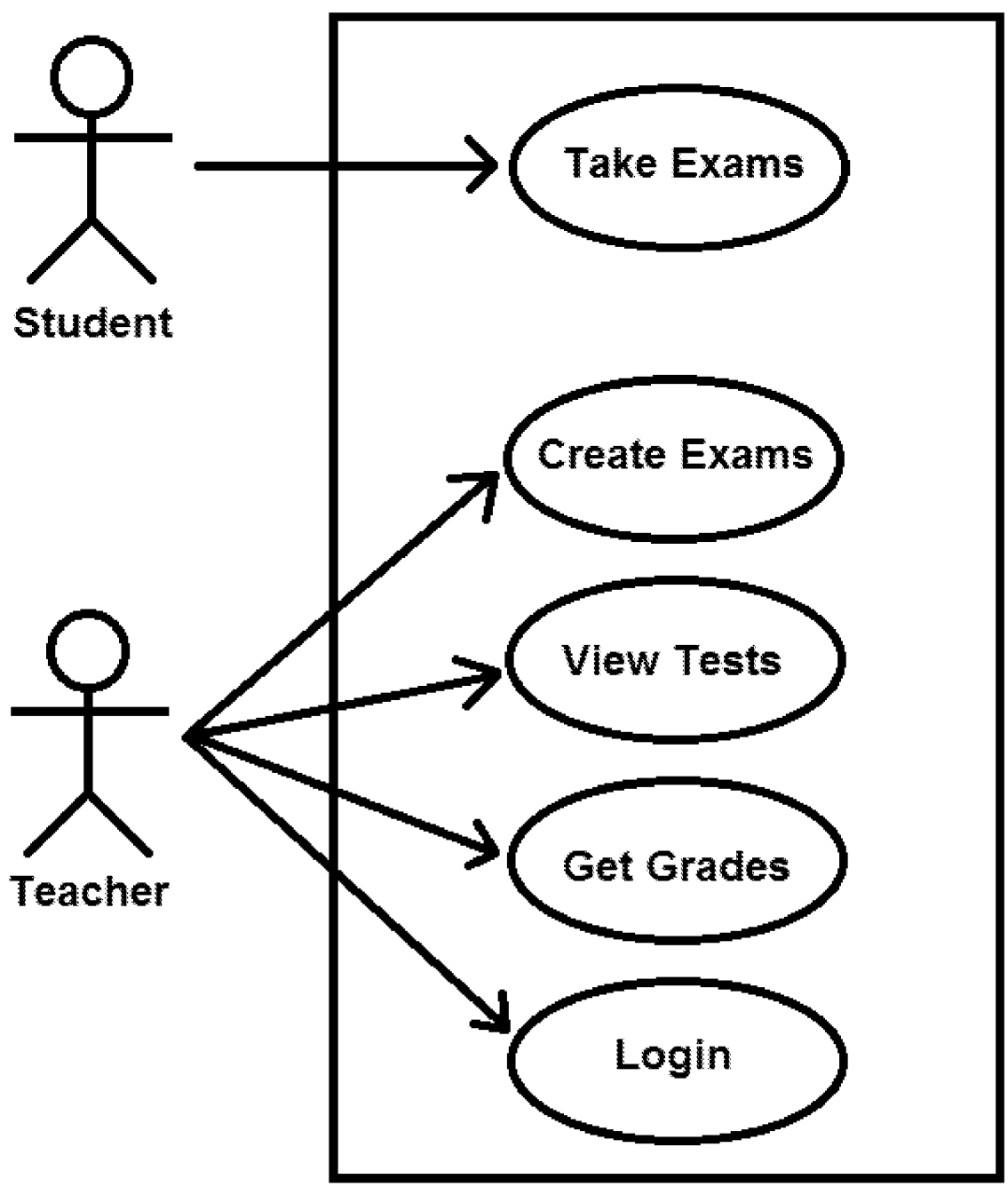
FIG. 1 illustrates a general overview of a testing administration system of the present invention.

FIG. 1 is a general overview of certain system functions of a system of the present invention. In particular, a test taker, e.g., student, may utilize the present invention to take a test or exam as prepared by an administrator or materials publisher. Additionally, an administrator, e.g., instructor, may utilize the present invention to create tests or exams, view tests or exams, collect and review test/exam scores/grades, as well as log into an aspect of the system to perform one or more of these operations. The tests are preferably multiple-choice exams but it is within the scope of the present invention for even essay answers to be analyzed by technology which seeks key words in essays and evaluates them via actual or artificial intelligence software. The creation of a test by the administrator or teacher includes of course the provision of the answer "key" which corresponds the desired and correct answers to each of the questions. An administrator can provide the exact number of questions and answers for a single test or could create a bank of test questions and corresponding answers with the software selecting the number of questions from the data bank for each student as indicated by the administrator.

Figure 2:
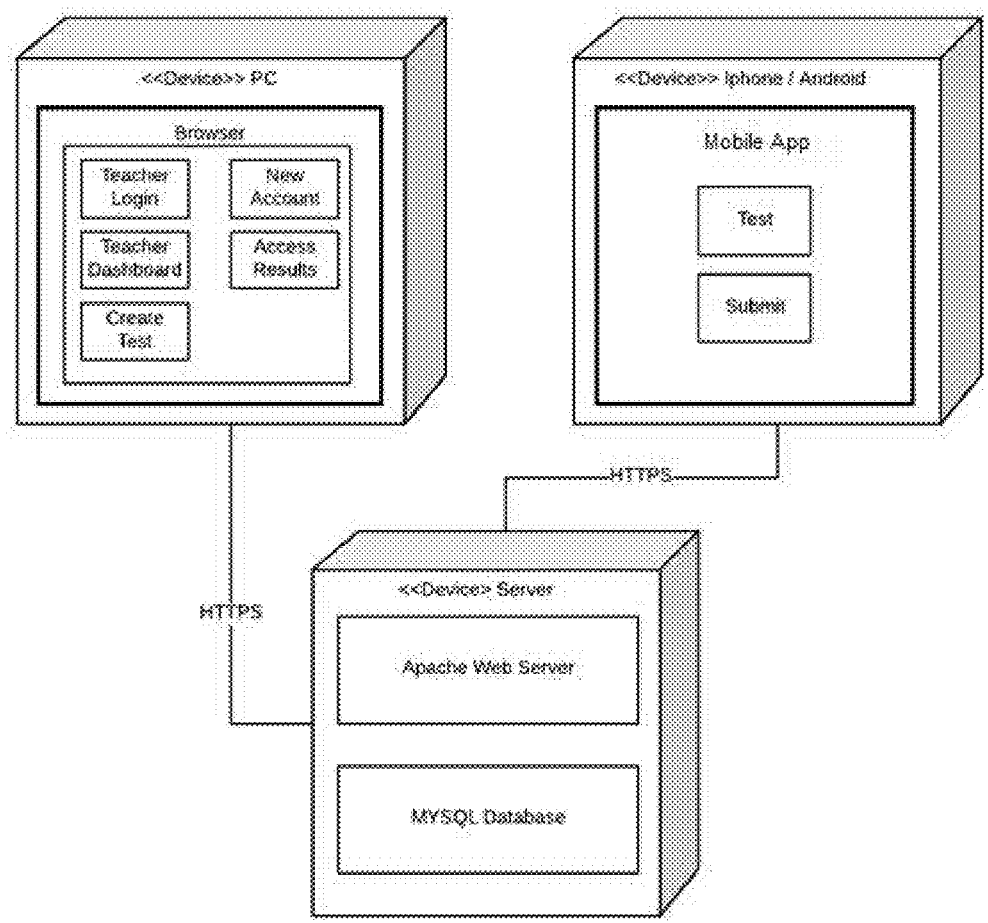
FIG. 2 illustrates a first operational overview of a testing administration system of the present invention.

As illustrated in FIG. 2, in one embodiment of the present invention, the system may include at least and preferably three different devices—a device utilized by the administrator (non-limiting example of a personal computer in FIG. 2), a device utilized by the test taker (non-limiting example of an ANDROID- or IOS-based mobile device in FIG. 2), and a server which is capable of at least wirelessly receiving signals as transmitted by the mobile devices. Those signals are the selected and thought to be correct answers to the questions of the test, as provided by the students. The server will compare. The answers provided by the student to the correct answer for each of the test questions and determine a grade, in the case of simple multiple choice, correct or incorrect, in the case of artificial intelligence grading simple essay questions, it could be correct or incorrect response or A, B, C, or D or F or +1, +2, +3, +4 or a zero. Test question by test question, the server will score the test taken by the student and provide an individual raw score for that student.

The server can also perform other functions for the teacher and possibly the student. For example, the server can calculate the average of all test takers, the mean, mode, standard deviation, and even if necessary the "curve" to be applied to each score. And, the server can evaluate and provide to the administrator which questions were consistently or frequently answered correctly, incorrectly, etc. and by which student(s) so that the administrator can evaluate the need for remedial teaching and work by the entire class, sections or groups, and/or individuals.

The device utilized by the administrator may employ a browser-based application. This application may permit administrators to log into an administrator dashboard, create tests and the correct and preferred answers with key words, review completed tests and testing results, see certain metrics and statistics relating to the tests (including test score mean and test score median), and the like. Test creation may also produce an individual test code, which may be a randomized number code, and this test code may be required for test takers to access and input so as to allow only authorized individuals to have access to the specific test. Once that access code is used, it will be destroyed or blocked from used again and that will tend to prevent another user's attempt to access the same test for test taking. This tends to minimize test cheating, access to the exam and submission by another of exam answers. As another mechanism to ensure integrity, at the very beginning of the course, or upon orientation/admission to the course, the administrator can request individual student's mobile phone numbers so that the student's phone and test code are used to ensure that only that phone will be provided with the ability to submit answers. And, in one embodiment of the present invention, the test itself can be sent to the mobile phone as data or a document so that, again, the students' mobile phone will be the only device(s) to obtain the test questions and have the ability to submit answers.

The device utilized by the test taker may employ a mobile application that permits accessing and taking a test on the device. This application may require test takers to log into the application to access tests and to submit answers, the latter being wirelessly done back to the server device. Log-in information may include name, identification number (including school or university identification number), the test code associated with the relevant test, and the like. The server will check and allow only authorized phones, student names/codes and test codes to access and submit test answers.

Upon logging-in, the test taker may be directed to a testing screen for taking the relevant test, at which point, the test taker may begin answering the test-associated questions provided on one or more screens within the mobile device application. Upon finishing the test, the test taker may submit the test answers by a submission physical function. Alternatively, the submission function may be a simple timer, say, 1, 2 or 3 hours between initiation of the test and the submission of test answers by the student. The submission function may include safeguards to prevent accidental/early test submission, including but not limited to holding down the submission button for a defined duration, the duration being sufficiently long so as to implicate only intentional submissions.

The server may host a test-related database, such as a MYSQL database. Documents and data stored in such a database include created test questions and associated correct answers and points or a grade associated with correct and/or incorrect answers (some questions can be weighted as more important than others), relevant administrator log-in information (including but not limited to username and password), test taker-submitted test answers, and the like. The browser-based application of the administrator's device will communicate with such a database in connection with administrator account and test information storage. The mobile device application may wirelessly communicate with such a database of the server in connection with submitted test answer data storage.

Figure 3:
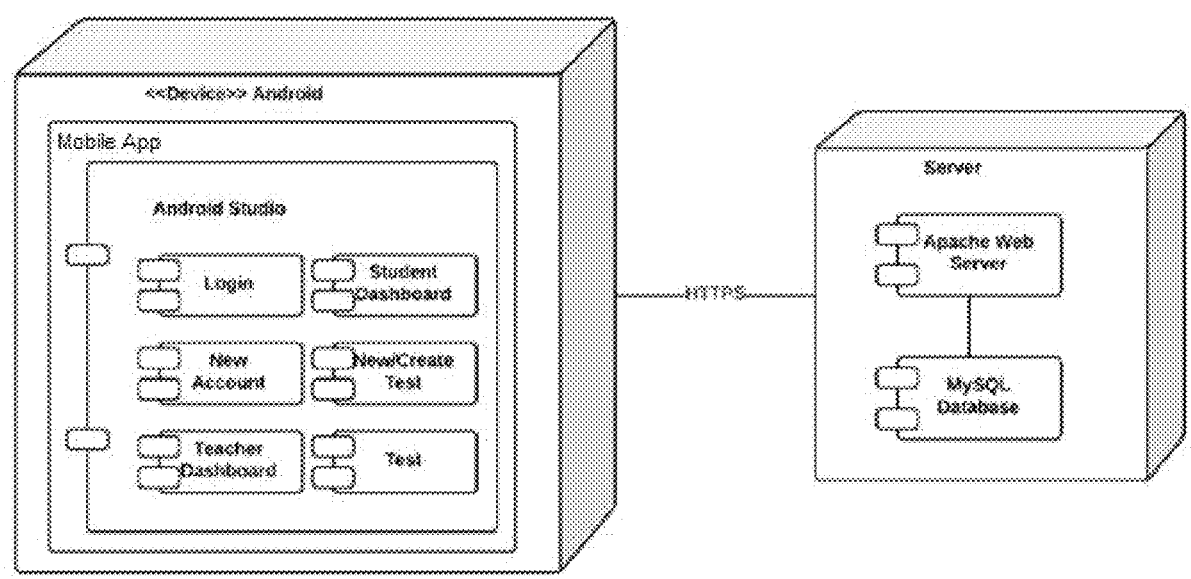
FIG. 3 illustrates a second operational overview of a testing administration system of the present invention.

As illustrated in FIG. 3, in another embodiment of the present invention, the system may include a device utilized by the administrator and/or the test taker (non-limiting example of an ANDROID-based mobile device in FIG. 3) and a server. The device utilized by the administrator and/or the test taker may employ a mobile device application capable of the operations associated with the browser-based application and/or mobile device application described with respect to FIG. 2. The server of the embodiment of FIG. 3 may operate similarly to the server described with respect to FIG. 2.

In one embodiment of a mobile device application associated with the present invention, the application may include at least five different aspects, or pages, such as a Log-in page, a New Account page, a Dashboard page, a View/Create Test page, and an Answer Form page. In this non-limiting example, the first page may be the Log-in page configured to permit or require administrators to log into the application. This page may be optional for test takers, i.e., test takers may continue to a different page without requiring a log-in. This page may also provide a link to the New Account page. The second page may be the New Account page configured to permit an administrator to create an account for purposes of managing classes, tests, scores/grades, and the like. The third page may be the Dashboard page. For test takers, the Dashboard page may require that the test taker enter the unique test code associated to the desired test and possibly be doing so from the previously entered authorized mobile phone of the students, as entered by the Administrator. For administrators, the Dashboard page may permit administrators to view test scores/grades for each test taker-submitted test answer set, such as those submitted via the mobile device application, as well as submitted test answers for each individual question. The fourth page may be the View/Create Test page configured to permit administrators to view previously-created tests, create new tests, add test keys, change test question weighting, and the like. The fifth page may be the Answer Form page configured to permit a test taker to input answers to test questions, including multiple choice test questions, and submit test answers. Those Answer Form pages are transmitted to the test-takers' mobile phones and the submitted answers by the test takers wirelessly transmitted to the server upon competition, whether by intentional submission by the student or by lapse of time, or, possibly, if the server detects too much time has lapsed by the test taker being "off line." Upon submission, these test answers may be transmitted to the server-associated database for analysis and storage.

The systems and methods of the present invention may include additional features, such as those configured to prevent cheating. In one additional feature, a warning message may be provided to the test taker within the mobile device application after the test taker has commenced testing. This message may alert the test taker of remaining time to auto submission of answers, to not exit, minimize, or otherwise leave the mobile device application prior to test completion, and that such an exit would result in immediate test submission. In another additional feature, the mobile device application may include a timer feature, such that if the test taker exits, minimizes, or otherwise leaves the mobile device application, the timer feature begins timing the exit duration. If the test taker has left the mobile device application for duration longer than a defined acceptable period (30 seconds in a non-limiting example), the mobile device application would automatically submit the test answers and alert the test taker that the test answers have been submitted due to leaving the application for too long a duration. If the test taker leaves and returns to the mobile device application in a duration less than a defined acceptable period, the mobile device application may provide the test taker with a warning message notifying the test taker that he or she left the mobile device application and that should any exit occur again, the test answers will be auto-submitted. Duration of leaving the test platform can be for each test question, for a test section and can be accumulated throughout the test. Accordingly, upon a second or "over the limit" leaving of the mobile device application, the mobile device application would automatically submit the test answers and optionally alert the test taker and the administrator that the test answers have been submitted due to leaving the application for a second or excessive time.

In a preferred example of this embodiment, the mobile device application on the student phone may be configured to include "Draw Over Other Apps" capabilities, such that warning messages may be provided to the test taker when he or she has left the mobile device application and entered other mobile device applications. Additionally, the mobile device application may submit test answers should the test taker receive and then reply or attempt to reply to a text message, a phone call, or similar communication. These anti-cheating mechanisms are an efficient deterrent since test takers cannot otherwise sufficiently and repeatedly access websites and other mobile device applications, consult with one another or others, including Internet browser applications, camera/photo applications, communication applications, social media applications (INSTAGRAM, FACEBOOK, etc.) and the like.

The embodiments and examples above are illustrative, and many variations can be introduced to them without departing from the spirit of the disclosure or from the scope of the invention. For example, elements and/or features of different illustrative and exemplary embodiments herein may be combined with each other and/or substituted with each other within the scope of this disclosure. Therefore, it is intended that the invention not be limited to the particular embodiments disclosed, but that the invention will include all embodiments falling within the scope of the claims. For a better understanding of the invention, its operating advantages and the specific objects attained by its uses, reference should be had to the accompanying drawings and descriptive matter, in which there is illustrated a preferred embodiment of the invention.

What is claimed is:

1. A system for testing administration by a test administrator for one or more test takers comprising:
    a primary device associated with a test administrator, the primary device configured to permit, via a primary device application executable thereon, creation of one or more composed test question sets and associated and correct test question answers, and review of one or more test taker completed test answer sets;
    one or more secondary devices associated with one or more test takers, each of the one or more secondary devices configured to permit and submit, respectively, via a secondary device testing application executable thereon, access to a test question set and wirelessly a test taker test question answer set of the one or more test questions in a test question set, wherein the secondary device testing application is configured to automatically display a warning message over one or more secondary device additional applications in response to exiting the secondary device testing application and opening at least one of the one or more secondary device additional applications, time a duration for which a test taker has exited the secondary device testing application, and automatically submit the test taker question answer set upon the duration exceeding a defined acceptable duration and provide an alert to the primary device associated with the test administrator indicating that the test taker question answer set has been submitted due to the test taker exiting the secondary device testing application for the duration exceeding the defined acceptable duration; and
    a server connected with the primary device and wirelessly to the one or more secondary devices, the server configured to store the one or more composed test question sets, the associated and correct test question answers and compare the test taker question answer set to the associated and correct test question answers in a hosted database and provide a grade based thereon.

2. The system of claim 1, wherein the primary device is a personal computer or a mobile computing device.

3. The system of claim 1, wherein the primary device application is a browser-based application.

4. The system of claim 1, wherein the primary device application is configured to provide one or more statistics or metrics associated with the grades of the test takers.

5. The system of claim 1, wherein each of the one or more secondary devices is a mobile computing device.

6. The system of claim 1, wherein the secondary device testing application is a mobile device application.

7. The system of claim 1, wherein the secondary device testing application is configured to wirelessly submit the test taker question answer set after a pressing or a touching of a submission feature for a defined intentional submission duration.

8. The system of claim 1, wherein an order of questions of the test question set is configured to vary between a first test taker and a second test taker of the one or more test takers, the varying being based on a randomized reordering generation or a physical proximity between the first test taker and the second test taker.

9. A method of testing administration by a test administrator for one or more test takers comprising:
    creating one or more composed test question sets and associated and correct test question answers via a primary device application executable on a primary device associated with a test administrator;
    storing the one or more composed test question sets and associated and correct test question answers in a database hosted on a server connected with the primary device and one or more secondary devices individually associated with one or more test takers;
    accessing a test question set of the one or more composed test question sets from the database via a secondary device testing application executable on a secondary device of the one or more secondary devices;
    automatically displaying a warning message via the secondary device testing application over one or more secondary device additional applications in response to exiting the secondary device testing application and opening at least one of the one or more secondary device additional applications;
    timing a duration for which a test taker has exited the secondary device testing application;

automatically submitting the test taker question answer set upon the duration exceeding a defined acceptable duration;

providing an alert to the primary device associated with the test administrator indicating that the test taker question answer set has been submitted due to the test taker exiting the secondary device testing application for the duration exceeding the defined acceptable duration;

wirelessly submitting a test taker's test question answer set corresponding to the test question set via the secondary device testing application; and storing the test answer set in the database and comparing a submitted test taker's test question answer set of one or more test takers to the associated and correct test question answers and thereby determining a grade for each of the test takers.

10. The method of claim 9, wherein the primary device is a personal computer or a mobile computing device.

11. The method of claim 9, wherein the primary device application is a browser-based application.

12. The method of claim 9, wherein the primary device application provides one or more statistics or metrics associated with one or more test taker's test question answer set.

13. The method of claim 9, wherein the secondary device is a mobile computing device.

14. The method of claim 9, wherein the secondary device testing application is a mobile device application.

15. The method of claim 9, wherein the secondary device testing application submits the test taker's test question answer set after a pressing or a touching of a submission feature for a defined intentional submission duration.

16. The method of claim 9, wherein an order of questions of the test question set varies between a first test taker and a second test taker of the one or more test takers, the varying being based on a randomized reordering generation or a physical proximity between the first test taker and the second test taker.

* * * * *